US012634852B2

(12) United States Patent　　　　(10) Patent No.:　US 12,634,852 B2
Liu et al.　　　　　　　　　　　　　(45) Date of Patent:　May 19, 2026

(54) CLOCK UPDATE FOR WIRELESS NETWORK

(71) Applicant: QUALCOMM Incorporated, San Diego, CA (US)

(72) Inventors: Tingting Liu, Cambridge (GB); Nicolas Graube, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 18/152,589

(22) Filed: Jan. 10, 2023

(65) Prior Publication Data

US 2024/0236887 A1　　Jul. 11, 2024

(51) Int. Cl.
*H04W 56/00*　　　(2009.01)
(52) U.S. Cl.
CPC .............................. *H04W 56/0015* (2013.01)
(58) Field of Classification Search
CPC ........... H04W 56/0015; H04W 56/001; H04W 56/0025; H04W 56/0045; H04W 56/005; H04W 56/0065
USPC ........................................................ 370/329
See application file for complete search history.

(56) References Cited

U.S. PATENT DOCUMENTS

| | | | | |
|---|---|---|---|---|
| 10,257,798 B1 * | 4/2019 | Koelemeij | .......... | H04W 56/006 |
| 11,005,585 B1 * | 5/2021 | Gopalakrishnan | .... | H04J 3/0667 |
| 2011/0281571 A1 * | 11/2011 | Patel | ................. | H04W 56/0015 |
| | | | | 455/418 |

| | | | | |
|---|---|---|---|---|
| 2014/0301375 A1 * | 10/2014 | Nusairat | ........... | H04W 56/0045 |
| | | | | 370/336 |
| 2015/0341881 A1 * | 11/2015 | Hiltunen | ............... | H04W 56/00 |
| | | | | 370/350 |
| 2019/0191403 A1 * | 6/2019 | Goel | .................... | H04L 27/2695 |
| 2020/0241146 A1 * | 7/2020 | Kim | ......................... | G01S 19/39 |
| 2020/0322908 A1 * | 10/2020 | Prakash | .............. | H04W 56/004 |
| 2021/0022008 A1 | 1/2021 | Jeon et al. | | |
| 2021/0058884 A1 * | 2/2021 | Liu | ........................... | H04J 3/06 |

(Continued)

FOREIGN PATENT DOCUMENTS

WO　　　　2019237725 A1　12/2019

OTHER PUBLICATIONS

International Search Report and Written Opinion—PCT/US2023/082377—ISA/EPO—May 2, 2024.

(Continued)

*Primary Examiner* — Robert J Lopata
(74) *Attorney, Agent, or Firm* — QUALCOMM Incorporated

(57)　　　　　ABSTRACT

Disclosed are systems, apparatuses, processes, and computer-readable media for wireless communications. In one illustrative example, a first network device for wireless communication can receive, from a second network device, a synchronization message comprising synchronization information. The first network device can determine clock information based on the synchronization information. The first network device can generate a clock update command based on the clock information. The first network device can further transmit the clock update command to one or more wireless communication devices associated with the first network device. The first network device can apply the clock information to a clock of the first network device such that the first network device is synchronized with the second network device.

28 Claims, 11 Drawing Sheets

(56) References Cited

U.S. PATENT DOCUMENTS

| | | | |
|---|---|---|---|
| 2024/0063933 A1* | 2/2024 | Gonuguntla | H04J 3/0644 |
| 2024/0163000 A1* | 5/2024 | Agarwal | H04W 56/0015 |
| 2025/0330923 A1* | 10/2025 | Beg | H04W 56/001 |

OTHER PUBLICATIONS

Woolley M., "Bluetooth Core Specification v5.1 Feature Overview", Bluetooth, Jan. 28, 2019, pp. 1-12, XP055734042, Paragraph [04.0].

* cited by examiner

100

| Size | Field | Description |
|---|---|---|
| 2 Octets | Delta Offset | Contains the delta time for the same group between the current new Joining AP Sync and the assigned central AP |
| 1 Bit | Offset Units | Indicates the units used by the Delta Offset field<br><br>0 – 30µs<br>1 – 300µs |
| 2 Octets | Instant | Used to indicate the paEventCount value when the clock adjustment shall apply |

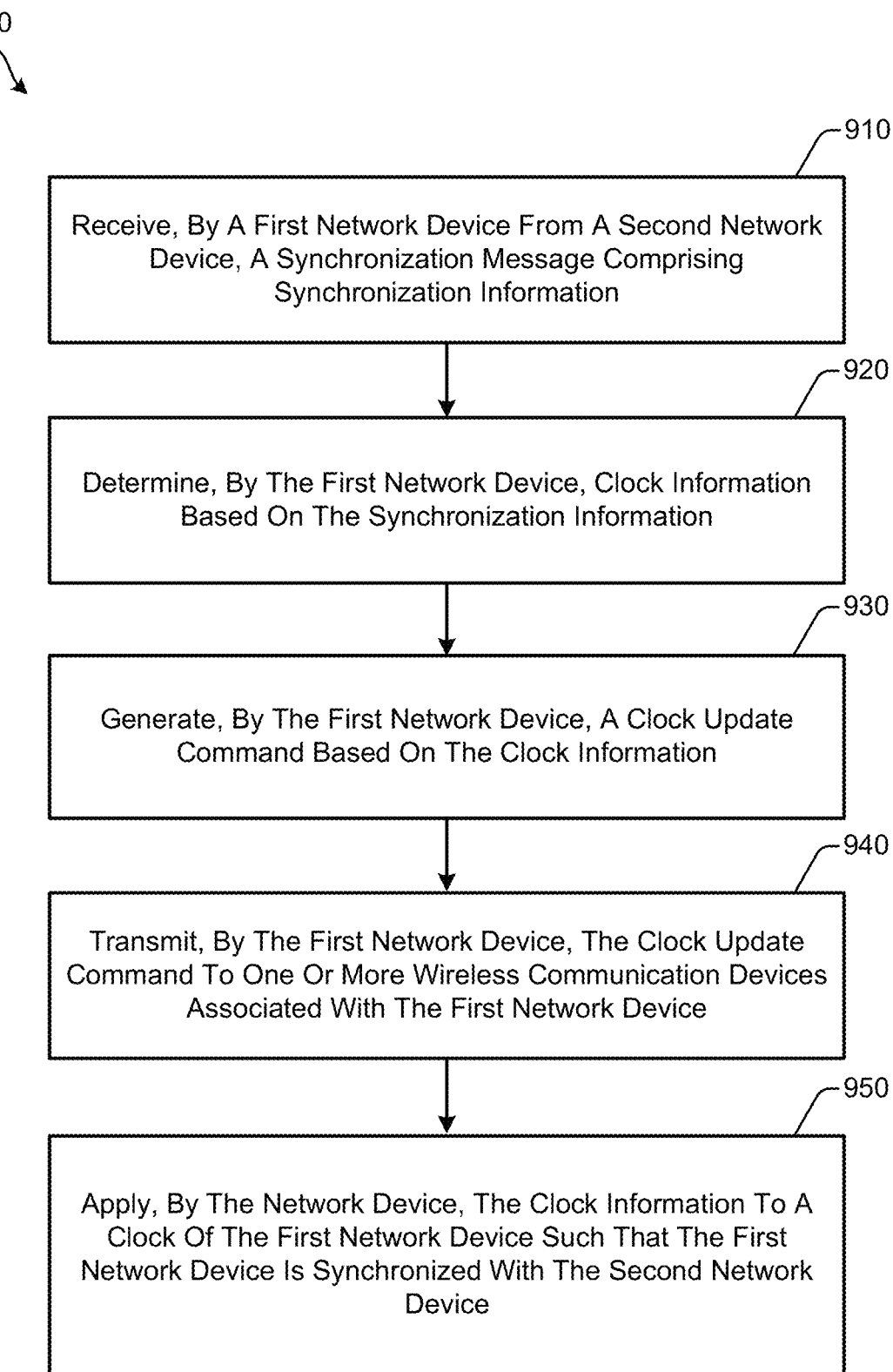

910

Receive, By A First Network Device From A Second Network Device, A Synchronization Message Comprising Synchronization Information

920

Determine, By The First Network Device, Clock Information Based On The Synchronization Information

930

Generate, By The First Network Device, A Clock Update Command Based On The Clock Information

940

Transmit, By The First Network Device, The Clock Update Command To One Or More Wireless Communication Devices Associated With The First Network Device

950

Apply, By The Network Device, The Clock Information To A Clock Of The First Network Device Such That The First Network Device Is Synchronized With The Second Network Device

Receive, By A Wireless Communication Device, A Clock Update Command From A Network Device, Wherein The Clock Update Command Comprises Clock Information

1020

Apply, By The Wireless Communication Device, The Clock Information To A Clock Of The Wireless Communication Device Such That The Wireless Communication Device Is Synchronized With The Network Device

CLOCK UPDATE FOR WIRELESS NETWORK

FIELD OF THE DISCLOSURE

The present disclosure generally relates to wireless communications. For example, aspects of the present disclosure relate to a clock update (e.g., a change in a time schedule for the transmission of a periodic advertisement train at an access point) in a wireless communication device (e.g., electronic shelf label) system.

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for wireless communications. According to at least one example, a method of wireless communication performed at a first network device (e.g., an access point) is provided. The method includes: receiving, by the first network device from a second network device, a synchronization message comprising synchronization information: determining, by the first network device, clock information based on the synchronization information: generating, by the first network device, a clock update command based on the clock information: transmitting, by the first network device, the clock update command to one or more wireless communication devices associated with the first network device; and applying, by the first network device, the clock information to a clock of the first network device such that the first network device is synchronized with the second network device.

In another illustrative example, a first network device for wireless communication is provided. The first network device includes at least one memory and at least one processor coupled to the at least one memory and configured to: receive, from a second network device, a synchronization message comprising synchronization information: determine clock information based on the synchronization information: generate a clock update command based on the clock information: transmit the clock update command to one or more wireless communication devices associated with the first network device; and apply the clock information to a clock of the first network device such that the first network device is synchronized with the second network device.

In another illustrative example, a non-transitory computer-readable medium of a first network device is provided that has stored thereon instructions that, when executed by: at least one processor, cause the at least one processor to: receive, from a second network device, a synchronization message comprising synchronization information: determine clock information based on the synchronization information: generate a clock update command based on the clock information: transmit the clock update command to one or more wireless communication devices associated with the first network device; and apply the clock information to a clock of the first network device such that the first network device is synchronized with the second network device.

In another illustrative example, a first network device for wireless communications is provided. The first network device includes: means for receiving, by the first network device from a second network device, a synchronization message comprising synchronization information: means for determining, by the first network device, clock information based on the synchronization information: means for generating, by the first network device, a clock update command based on the clock information: means for transmitting, by the first network device, the clock update command to one or more wireless communication devices associated with the first network device; and means for applying, by the first network device, the clock information to a clock of the first network device such that the first network device is synchronized with the second network device.

In another illustrative example, a method of wireless communication performed at a wireless communication device (e.g., a peripheral device, such as an electronic shelf label (ESL)) is provided. The method includes: receiving, by the wireless communication device, a clock update command from a network device, wherein the clock update command comprises clock information; and applying, by the wireless communication device, the clock information to a clock of the wireless communication device such that the wireless communication device is synchronized with the network device.

In another illustrative example, a wireless communication device for wireless communication, the wireless communication device comprising: at least one memory; and at least one processor coupled to the at least one memory and configured to: receive a clock update command from a network device, wherein the clock update command comprises clock information; and apply the clock information to a clock of the wireless communication device such that the wireless communication device is synchronized with the network device.

In another illustrative example, a non-transitory computer-readable medium of a wireless communication device is provided that has stored thereon instructions that, when executed by at least one processor, cause the at least one processor to: receive a clock update command from a network device, wherein the clock update command comprises clock information; and apply the clock information to a clock of the wireless communication device such that the wireless communication device is synchronized with the network device.

In another illustrative example, a wireless communication device for wireless communications is provided. The wireless communication device includes: means for receiving, by the wireless communication device, a clock update command from a network device, wherein the clock update command comprises clock information; and means for applying, by the wireless communication device, the clock information to a clock of the wireless communication device such that the wireless communication device is synchronized with the network device.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is table illustrating an example of clock update information that may be contained within a command for updating a clock, in accordance with some aspects of the present disclosure.

FIG. 9 is a flow chart illustrating an example of a process for wireless communications at a network device, in accordance with some aspects of the present disclosure.

DETAILED DESCRIPTION

Figure 1:
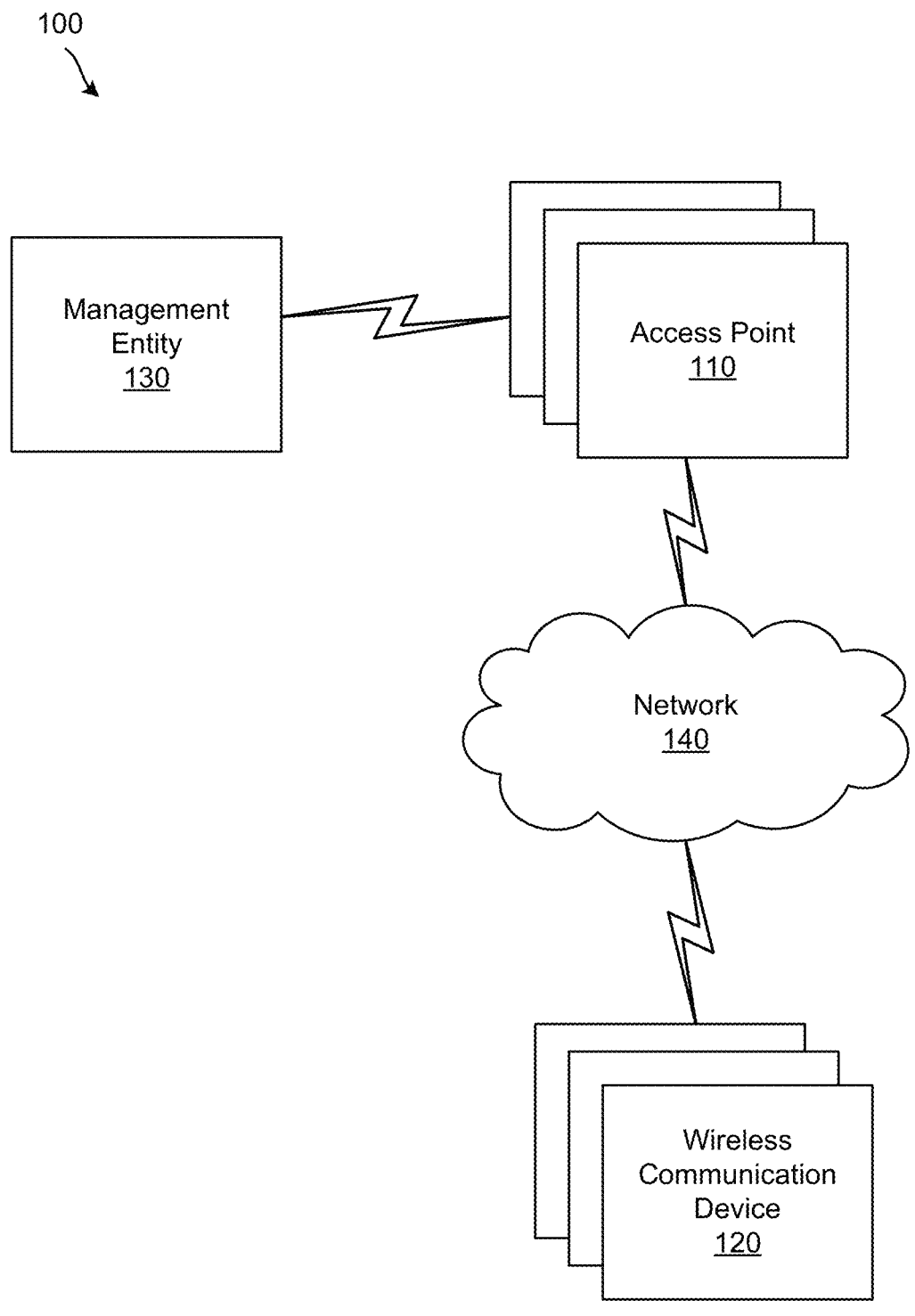
FIG. 1 is a diagram illustrating an example environment in which systems and/or methods described herein may be implemented, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. The network entity may communicate with the one or more wireless communication devices via one or more network devices. For example, an electronic shelf label (ESL) system may include one or more ESLs that are controlled by a management entity (ME). To facilitate control by the management entity, each ESL may have a wireless connection (e.g., a BLUETOOTH® Low Energy (BLE) connection or other connection) to an access point (AP) that is communicatively connected to the management entity (e.g., via the Internet, such as wirelessly, via an Ethernet connection, etc.). In some cases, commands from the management entity may be wirelessly transmitted to the ESLs by the access point. Responses or information from the ESLs may also be received by the access point and provided by the access point to the management entity. Each access point may have an associated channel map. A channel map is a listing of frequency channels to be utilized or, conversely, not to be utilized (e.g., in the context of modification of frequency hopping sequences) by an access point for communication, such as with the ESLs or other devices. While examples are described herein using ESLs as illustrative examples of wireless communication devices, a management entity as an example of a network entity, and access points as examples of network devices, the systems and techniques described herein are applicable to any type of system or network.

In some cases, an ESL may be physically moved to a new location. For example, the ESL may be moved from one location in a retail store (e.g., a particular shelf or a storage area) to a different location. Changing the location of the ESL may result in the ESL losing synchronization with (e.g., due to being out of range) a current access point for which the ESL is associated. Such a loss in synchronization may interrupt the management entity's ability to control the ESL and the ESL's ability to report to the management entity. After determining a network outage (e.g., caused by the loss of synchronization), the ESL may perform an onboarding procedure to reestablish synchronization with an access point. To perform the onboarding procedure, the ESL may transmit advertisement messages, receive a connection request from an in-range access point that detected the advertisement messages, and exchange messages with the access point (e.g., including the exchange of periodic advertisement synchronization transfer (PAST) information). The onboarding procedure may consume significant computing resources (e.g., processor resources, memory resources, and/or battery resources, among other examples) of the ESL and/or the access point, and frequent advertisement by one or more ESLs may result in spectral pollution on advertisement channels of the wireless network.

Currently, access point synchronization (e.g., described in detail in the description of FIG. 4) can enable discovery and synchronization of communication timings of multiple access points within an ESL system. In particular, periodic advertisement timings used by the multiple access points may be synchronized. In access point synchronization, an ESL can have access to multiple access points. When an ESL is moved from one location to another location such that the ESL is out of range of its current associated access point, the ESL can identify an alternative access point that is within range of the ESL to associate with and jump on a periodic advertisement with responses (PAwR) train associated with that access point.

In some cases, when an access point joins (e.g., becomes synchronized with) a set of synchronized access points, ESLs associated with that access point may lose synchronization because the ESLs may not have been updated to have the time schedule (e.g., the timing for issuance of a PA train) associated with the set of synchronized access points, but rather the ESLs may have the original time schedule associated with that access point. As a result of the ESLs losing synchronization, the ESLs may need to perform an onboarding procedure, which can be costly. For example, all access points within a set of access points may be synchronized with each other (e.g., by using the method described in the description of FIG. 4). An access point (AP1), not within the set of access points, can have a different time schedule (e.g., a different point in absolute time at which the PA train is transmitted) as the access points within the set of access points and have its own set of associated ESLs. The access point (AP1) can discover at least one of the access points within the set of access points, and can then synchronize itself to have the same time schedule (e.g., a same point in absolute time at which the PA train is transmitted) with the access points of the set of access points. In one or more examples, the access point (AP1) can be directed (e.g., by the discovered access point within the set of synchronized access points) to adjust its clock (e.g., frame/subframe transmission) to the schedule (e.g., PAwR train) defined by the access points within the set of access points. However, this change in schedule of the access point (AP1) can adversely affect its associated ESLs by causing the ESLs to lose synchronization, which can require the ESLs to perform an onboarding procedure, which can be very costly and wasteful of resources.

Systems and techniques are described herein for providing an updated time schedule (e.g., clock update) in a wireless communication device (e.g., ESL) system. In particular, the systems and techniques provide a solution to update a time schedule (e.g., for timing of PAwR trains) of access points as well as ESLs within an ESL system, such that the ESLs do not lose synchronization during the update. In one or more examples, the systems and techniques can provide a solution for ESLs to update their respective time schedules in a planned manner without the ESLs losing synchronization, while allowing for an access point within the ESL system to perform access point synchronization (e.g., as described in the description of FIG. 4).

In one or more aspects, the systems and techniques can provide a means of advertising an upcoming periodic advertisement (PA) schedule (e.g., a PAwR schedule) change. In one or more examples, the time schedule of an ESL can be updated for receiving activities based on parameters passed within a clock update command (e.g., which may be a vendor specific command) transmitted from an access point. In some examples, an update range of time for a clock update can be defined to be within one interval (e.g., an ESL scanning interval) of time, such as 1.6 seconds. The clock update command can correspond to changing a time schedule at which periodic transmissions (e.g., PAwR transmissions) are expected by an ESL (or other peripheral device). A transmission of the clock update command within at least N number (e.g., six) of intervals can ensure that all of the ESLs onboarded (e.g., which may be onboarded within different groups of ESLs) can have an opportunity to update their respective time schedules. As such, the systems and techniques can allow for ESLs to update their respective time schedules without the ESLs losing synchronization and requiring a re-onboarding.

Figure 4:
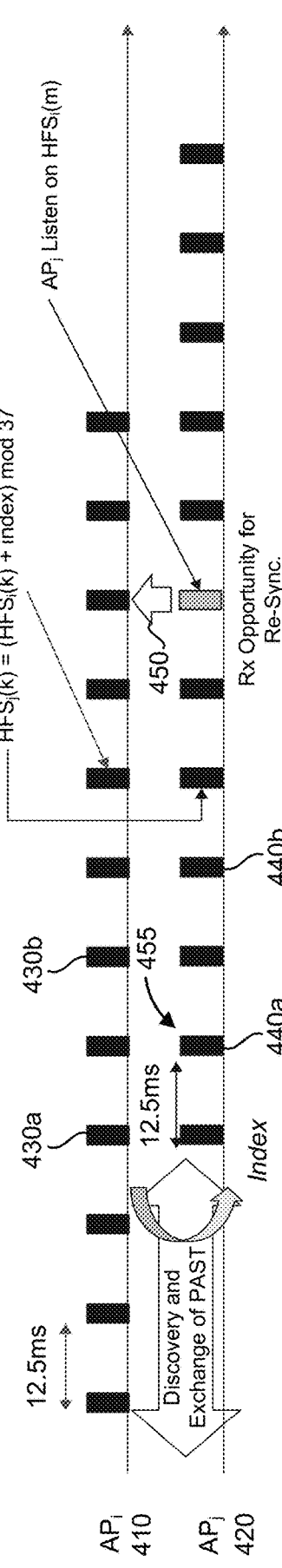
FIG. 4 is a diagram illustrating an example associated with discovery and synchronization between access points, in accordance with some aspects of the present disclosure.

In one or more aspects, the systems and techniques can employ access point synchronization where all of the access points can be synchronized with each other (e.g., by using the method described in the description of FIG. 4). Access point synchronization can be employed for various different use cases. One example use case can be an ESL system that has a requirement for its access points' PAwR trains to be synchronized with each other. Another example use case can be when an ESL has lost synchronization with its associated access point. The ESL can subsequently scan in other controlled channels for other access points in the time slot sequence as the current PAWR train without the need to be re-onboarded. An additional example use case can-use access point synchronization-to benefit an angle of arrival (AoA) determination (e.g., calculation) by onboarded ESLs by allowing for AoA receivers (e.g., of the onboarded ESLs) to have the ability to collect a periodic advertisement (PA) and a constant tone extension (CTE) (e.g., PA+CTE) from other ESLs, independent of which access point these other ESLs are onboarded.

Additional aspects of the present disclosure are described in more detail below.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or the device(s) 130. The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
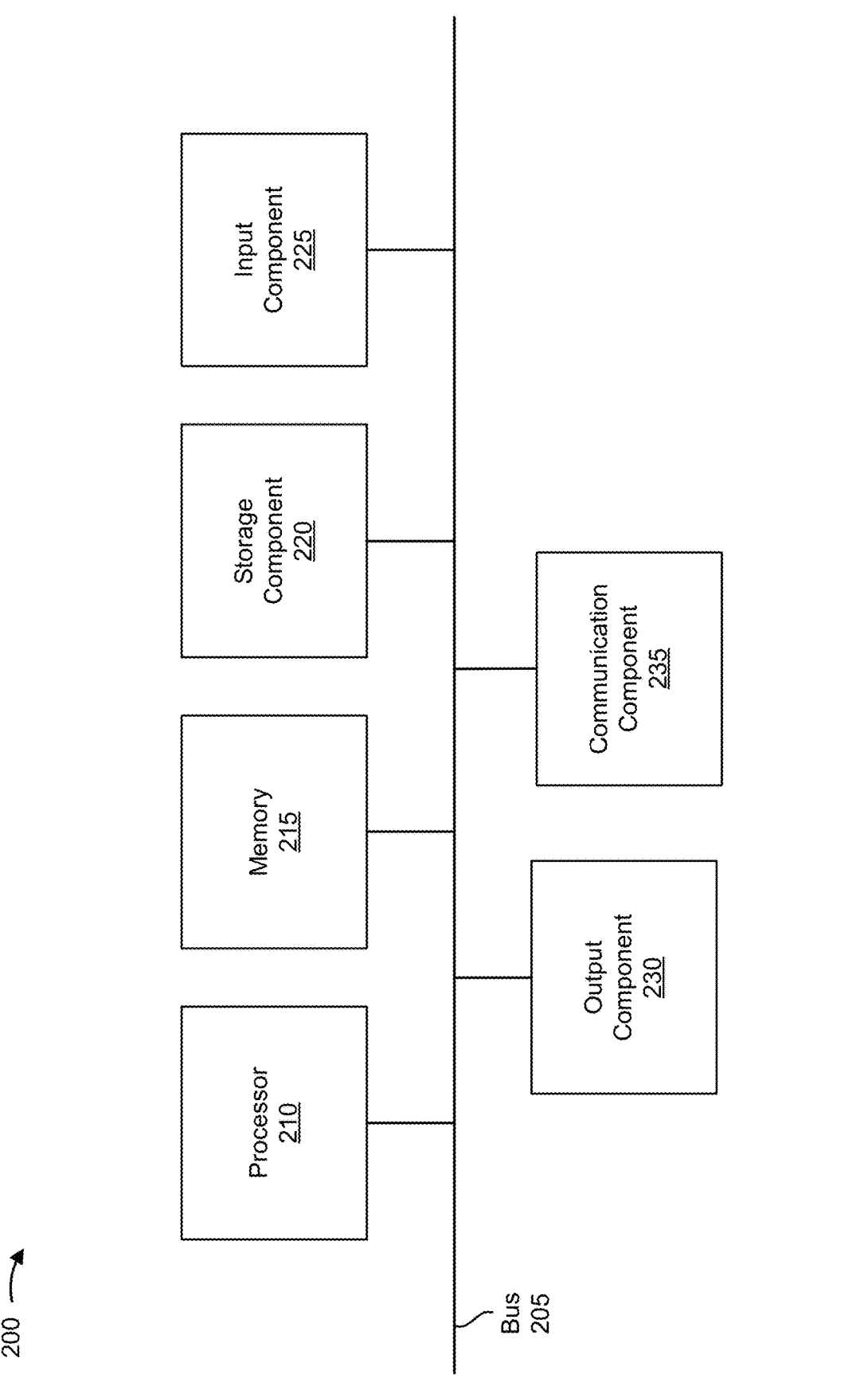
FIG. 2 is a diagram illustrating example components of a device, in accordance with some aspects of the present disclosure.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
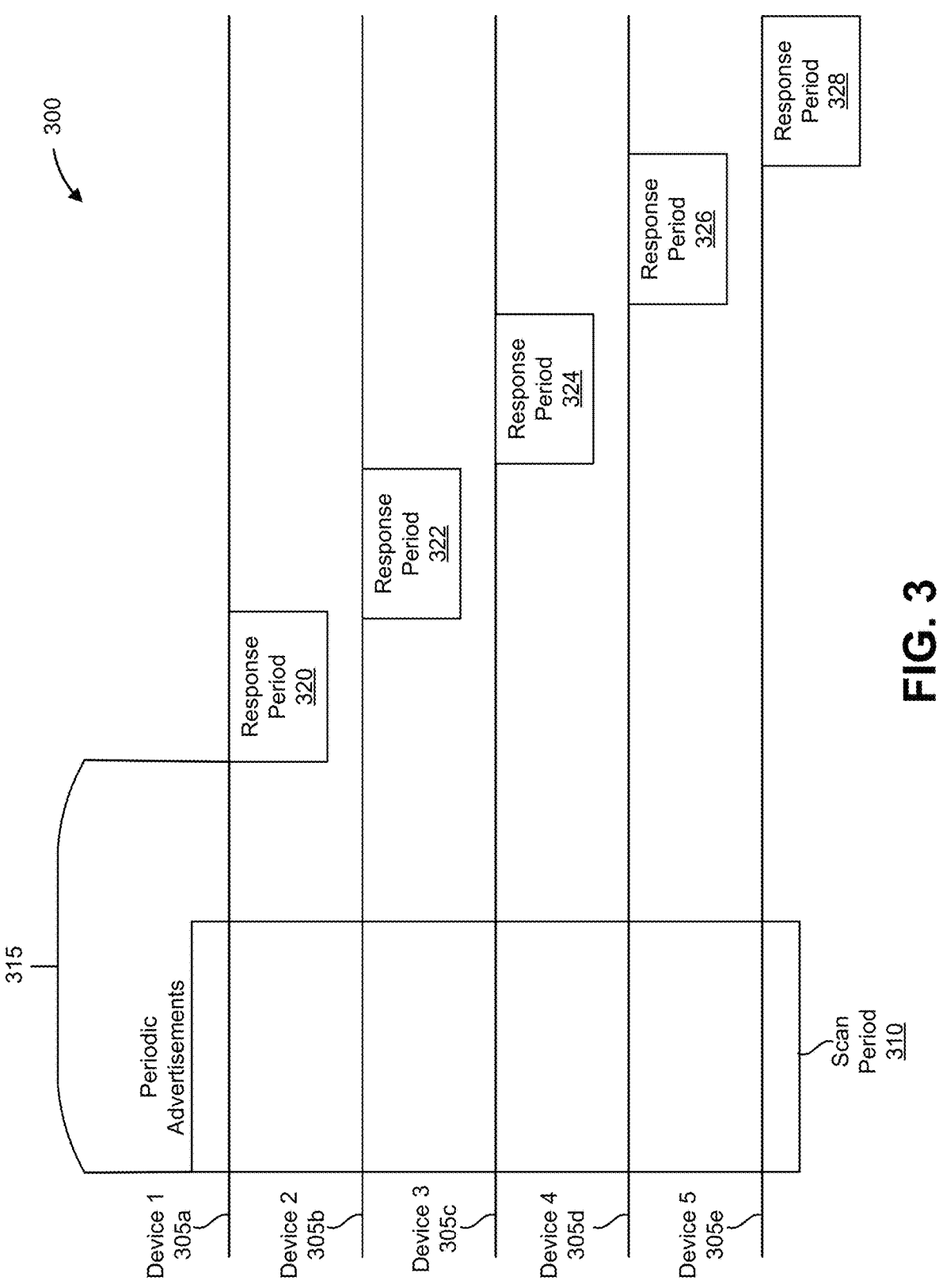
FIG. 3 is a signaling diagram illustrating example communication transmissions, in accordance with some aspects of the present disclosure.

FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305*a*, device 2 305*b*, device 3 305*c*, device 4 305*d*, and device 5 305*e*) of FIG. 3 may be selected from wireless communication devices 120 of FIG. 1, and may each receive a periodic advertisement (PA) in a scan period 310. The scan period 310 may occur in regularly scheduled intervals and may be repeated periodically such that the devices (e.g., device 1 305*a*, device 2 305*b*, device 3 305*c*, device 4 305*d*, and device 5 305*e*) can awaken to scan for messages during this repeated scan period 310. An access point (e.g., access point 110 of FIG. 1) may provide periodic advertisements (PAs) via broadcast or multi-cast to the devices (e.g., device 1 305*a*, device 2 305*b*, device 3 305*c*, device 4 305*d*, and device 5 305*e*) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305*a*, device 2 305*b*, device 3 305*c*, device 4 305*d*, and device 5 305*e*). The devices (e.g., device 1 305*a*, device 2 305*b*, device 3 305*c*, device 4 305*d*, and device 5 305*e*) may decode or filter the messages intended for each specific device and transmitted during the period when all devices are receiving. In this way, the devices (e.g., device 1 305*a*, device 2 305*b*, device 3 305*c*, device 4 305*d*, and device 5 305*e*) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305*a*, device 2 305*b*, device 3 305*c*, device 4 305*d*, and device 5 305*e*).

As illustrated, the devices (e.g., device 1 305*a*, device 2 305*b*, device 3 305*c*, device 4 305*d*, and device 5 305*e*) are each assigned a response period 320, 322, 324, 326, 328 in the time after the scan period 310. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305a is assigned response period 320, device 2 305b is assigned response period 322, device 3 305c is assigned response period 324, device 4 305d is assigned response period 326, and device 5 305e is assigned response period 328. The access point (e.g., access point 110 of FIG. 1) may store attributes of the devices (e.g., device 1 305a, device 2 305b, device 3 305c, device 4 305d, and device 5 305e), including whether a device is able to transmit or respond. The PA signaling followed by responses can be referred to as periodic advertisement with multiple responses (PAwR).

For example, device 3 305c (e.g., wireless communication device 120 of FIG. 1) may be an ESL and may receive a price update in a PA from the access point (e.g., access point 110 of FIG. 1) in scan period 310. The PA received at device 3 305c may include a designated start time for the response period 324 or may include a schedule of response start times for devices including device 3 305c. The response by device 3 305c to the access point (e.g., access point 110 of FIG. 1) may include an acknowledgement, a status code, and/or other information such as battery life, received signal strength, and/or an error notification. The response by device 3 305c may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305a, device 2 305b, device 3 305c, device 4 305d, and device 5 305e) may use channels of the Bluetooth protocol.

A device (e.g., device 5 305e) that has been assigned a response period may not respond and may determine that it has nothing to signal. In other words, the devices (e.g., device 1 305a, device 2 305b, device 3 305c, device 4 305d, and device 5 305e) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

FIG. 4 is a diagram illustrating an example of transmission timelines 400 associated with discovery and synchronization between access points (e.g., access points 110 of FIG. 1). As shown, example 300 includes access points (e.g., access points 110 of FIG. 1), shown as AP$_i$ 410 and AP$_j$ 420 on the transmission timelines 400. The access points AP$_i$ 410 and AP$_j$ 420 may be communicatively connected to a management entity (e.g., management entity 130 of FIG. 1). In some aspects, the access points and/or the management entity may be included in a wireless communication system, such as an ESL system. The wireless communication system may use a wireless communication technology, such as BLE.

As used herein, "transmission timing" or "periodic advertisement timing" may refer to a timing or schedule by which a device (e.g., an access point) transmits communications or periodic advertisements. For example, two devices that use (e.g., that are synchronized to) the same periodic advertisement timing may transmit periodic advertisements concurrently.

In one or more examples, during operation, a first access point AP1 (e.g., AP$_i$ 410) may transmit (e.g., broadcast) periodic advertisements (e.g., PAs 430a, 430b), such as a train of periodic advertisements. The periodic advertisements may be unidirectional broadcast messages. The first access point AP1 may transmit periodic advertisements in accordance with a PAwR schedule. Moreover, the first access point AP1 may transmit the periodic advertisements using a first hopping frequency sequence (HFS). The first HFS may be an HFS configured for the first access point AP1 (e.g., if the first access point AP1 is not a follower of another access point), or the first HFS may be different from a reference HFS based at least in part on a first index value associated with (e.g., selected by) the first access point AP1.

A second access point AP2 (e.g., AP$_j$ 420) may detect at least one periodic advertisement broadcast from the first access point AP1 (e.g., by scanning known channels on which the first access point AP1 performs transmissions and/or by scanning, or taking a snapshot of, an entire band). That is, the second access point AP2 may discover the first access point AP1. In some aspects, the second access point AP2 may listen on one or more advertisement channels (e.g., legacy advertisement channels) to detect information that enables the second access point AP2 to follow and synchronize with the first access point AP1, thereby enabling the second access point AP2 to monitor for the periodic advertisement(s) (e.g., PAs 430a, 430b). In some aspects, the second access point AP2 may monitor for (e.g., listen for) and detect the periodic advertisement(s) prior to initiation of periodic advertisement transmissions by the second access point AP2 (which may be referred to as a "detect before proceed" policy). For example, in a boot sequence during starting (or re-starting) of the second access point AP2, the second access point AP2 may listen for periodic advertisements from other access points before starting periodic advertisement transmissions. In some aspects, access points (e.g., isolated access points), such as the second access point AP2, may periodically listen for periodic advertisements from neighboring access points.

Based on detecting a periodic advertisement from the first access point AP1, the second access point AP2 may transmit, and the first access point AP1 may receive, a message (e.g., an unsolicited message) to initiate a connection between the first access point AP1 and the second access point AP2. Following the connection, or as part of the connection procedure, the first access point AP1 may transmit, and the second access point AP2 may receive, a synchronization message. The synchronization message may identify the periodic advertisement timing (e.g., the PAwR schedule) used by the first access point AP1. For example, the synchronization message may include PAST information that indicates the periodic advertising timing used by the first access point AP1 (e.g., by indicating a time offset used by the first access point AP1). In some cases, the PAST information may also include the values of all of the parameters required for HFS computation as well as the channel map. In addition, or alternatively, the synchronization message may identify the first HFS used by the first access point AP1. For example, the PAST information may also indicate a reference HFS used by the first access point AP1, and the first HFS may be the reference HFS or an HFS that is shifted (e.g., frequency shuffled) from the reference HFS. For example, if an HFS is shifted from a reference HFS, then at all frequency instances in a frequency sequence, a channel index of the HFS may be different from a channel index of the reference HFS. In some aspects, the synchronization message may identify the first HFS used by the first access point AP1 by indicating the first index value associated with the first access point AP1 (e.g., the first HFS may be determined using the first index value and the reference HFS). For example, the synchronization message may indicate a set of index values that includes the first index value and/or one or more additional index values, associated with additional access points, known to the first access point AP1. In some aspects, the set of index values may include an index value for the second access point AP2 that indicates an HFS to be used by the second access point AP2.

The exchange of periodic advertising timing information (e.g., the exchange of PAST information) may enable the second access point AP2 to synchronize with the first access point AP1. Accordingly, in the same manner, multiple additional access points may synchronize to the same periodic advertisement timing. For example, a third access point AP3 may also synchronize with the first access point AP1, and a fourth access point AP4 may synchronize with the third access point AP3, thereby resulting in the fourth access point AP4 being synchronized with the second access point AP2 by transitive synchronization. In this way, multiple access points may become time synchronized with each other.

As shown by reference number 455, based on receiving the synchronization message, the second access point AP2 may transmit periodic advertisements (e.g., PAs 440a, 440b), such as transmissions on a data channel, synchronized with the periodic advertisement timing (e.g., the PAwR schedule) used by the first access point AP1. In this way, periodic advertisements are transmitted concurrently by the first access point AP1 and the second access point AP2. However, the second access point AP2 may transmit the periodic advertisements according to a second HFS. The second HFS may be offset from (e.g., different from) the first HFS used by the first access point AP1 or a reference HFS. In other words, each of the access points (e.g., with physically overlapping coverage areas) may use an HFS that is different from an HFS of any of the other access points. By using different HFSs, interference among the access points may be avoided despite the access points being time synchronized. As such, for any two HFSs of different APs, the probability of selecting the same channel at the same instant of time should be low.

The second HFS may be based at least in part on a second index value (e.g., different from the first index value) associated with the second access point AP2. For example, each of the access points (e.g., with physically overlapping coverage areas) may be associated with a different index value from any of the other access points. Accordingly, based at least in part on the set of index values identified to the second access point AP2, the second access point AP2 may select the second index value to achieve an HFS (e.g., in a radio frequency range of the second access point AP2) that is orthogonal to every other HFS currently in use. In some aspects, the second HFS may be shifted relative to the first HFS or the reference HFS based at least in part on the second index value. For example, the second HFS may be determined according to Equation 1 below:

$$HFS_i = (HFS_0 + index_i) \bmod 37 \qquad \text{Equation 1}$$

where $HFS_0$ is the reference HFS, $HFS_i$ is the HFS being determined, and $index_i$ is the index value used to determine the HFS. Equation 1 uses a value of 37 for the modulo operation because a BLE system uses 37 data channels. However, a different value for the modulo operation may be used (e.g., corresponding to a quantity of channels) in other systems.

In some aspects, an index value may indicate an HFS in a manner other than as described above. That is, an index value may be any means to identify a hopping frequency channel (or "channel selection") sequence. For example, each access point and each wireless communication device may be configured with a set of HFSs, and an index value may map to a particular HFS of the set of HFSs. Thus, indication of a set of index values, as described herein, may refer to the indication of all active (e.g., in use) HFSs of the set of HFSs.

In some aspects, the first access point AP1 may transmit, and one or more wireless communication devices (e.g., wireless communication devices 120 of FIG. 1) may receive, information identifying the periodic advertisement timing (e.g., PAST information) used by the first access point AP1. For example, the first access point AP1 may transmit the information in connection with onboarding the wireless communication device(s) to the first access point AP1. In some aspects, the second access point AP2 may transmit, and one or more wireless communication devices (e.g., wireless communication devices 120) may receive, information identifying the periodic advertisement timing (e.g., PAST information) used by the second access point AP2. For example, the second access point AP2 may transmit the information to wireless communication devices already onboarded with the second access point AP2, or the second access point AP2 may cause the wireless communication devices to repeat an onboarding procedure with the second access point AP2 during which the information is transmitted.

In some aspects, the first access point AP1 may transmit (e.g., via broadcast), and one or more wireless communication devices (e.g., wireless communication devices 120 of FIG. 1) synchronized to the first access point AP1 may receive, information identifying a set of (e.g., one or more) index values indicating HFSs used by one or more access points. For example, the set of index values may include the first index value associated with the first access point AP1, the second index value associated with the second access point AP2, and/or one or more additional index values, associated with additional access points, known to the first access point AP1. Similarly, in some aspects, the second access point AP2 may transmit (e.g., via broadcast), and one or more wireless communication devices (e.g., wireless communication devices 120 of FIG. 1) synchronized to the second access point AP2 may receive, information identifying a set of (e.g., one or more) index values indicating HFSs used by one or more access points. For example, the one or more index values may include the first index value associated with the first access point AP1, the second index value associated with the second access point AP2, and/or one or more additional index values, associated with additional access points, known to the second access point AP2. In some aspects, the first access point AP1 and/or the second access point AP2 may receive, from the management entity, information indicating the index values that are in use (e.g., valid indexes) for one or more additional access points.

Over time (e.g., due to clock drift), the periodic advertisement timing used by the first access point AP1 and the second access point AP2 may become misaligned. As shown by reference number 450, the second access point AP2 may monitor (e.g., sporadically) for an additional periodic advertisement from the first access point AP1 in a monitoring opportunity. In other words, the second access point AP2 may sacrifice a periodic advertisement transmission (e.g., for a particular group of wireless communication devices) in order to monitor (e.g., listen) for the additional periodic advertisement from the first access point AP1. In some aspects, the monitoring opportunity, in which the second access point AP2 monitors for the additional periodic advertisement, may be based at least in part on an expected clock drift between the first access point AP1 and the second access point AP2. Based on a timing of the additional periodic advertisement, the periodic advertisement timing may be realigned between the first access point AP1 and the second access point AP2. For example, the second access point AP2 may realign with the periodic advertisement timing used by the first access point AP1 based at least in part on a timing of the additional periodic advertisement (e.g., based at least in part on a difference between the actual timing of the additional periodic advertisement and an expected timing of the additional periodic advertisement).

In some examples, an access point that uses a transmission timing or schedule (e.g., a periodic advertisement timing or schedule) that is followed by another access point may be referred to as a "leader access point," and an access point that synchronizes its transmission timing or schedule to the transmission timing or schedule of another access point may be referred to as a "follower access point." In some cases, an access point may be both a leader access point and a follower access point. For example, the transmission timing or schedule used by a first access point may be followed by a second access point, and a third access point may follow the transmission timing or schedule used by the second access point. Thus, in this example, the second access point is both a leader access point and a follower access point.

As indicated above, FIG. 4 is provided as an example. Other examples may differ from what is described with respect to FIG. 4.

As previously mentioned, in some cases, when an access point joins (e.g., becomes synchronized with) a set of synchronized access points, ESLs associated with that access point may lose synchronization and, as a result, the ESLs may need to perform an onboarding procedure, which can be costly. For example, all access points within a set of access points can be synchronized with each other (e.g., by using the method described in the description of FIG. 4). An access point (e.g., AP$_i$ 510b of FIG. 5), not within the set of access points, may have a different time schedule (e.g., scheduled timing for its PAwR) as the access points (e.g., APi 510a of FIG. 5) within the set of access points, and may have its own set of associated ESLs (e.g., ESL 520 of FIG. 5). The access point (e.g., AP$_i$ 510b of FIG. 5) can discover at least one of the access points (e.g., APi 510a of FIG. 5) within the set of access points, and can then synchronize itself with the access points of the set of access points. In one or more examples, the access point (e.g., AP$_i$ 510b of FIG. 5) can be directed (e.g., by the discovered access point within the set of synchronized access points) to adjust its clock (e.g., frame/subframe transmission) to the schedule (e.g., PAwR train) defined by the access points within the set of access points. However, this change in schedule of the access point (e.g., AP$_i$ 510b of FIG. 5) can adversely affect its associated ESLs (e.g., ESL 520 of FIG. 5) by causing the ESLs to lose synchronization, which can require the ESLs to perform an onboarding procedure, which can be very costly and wasteful of resources.

Figure 5:
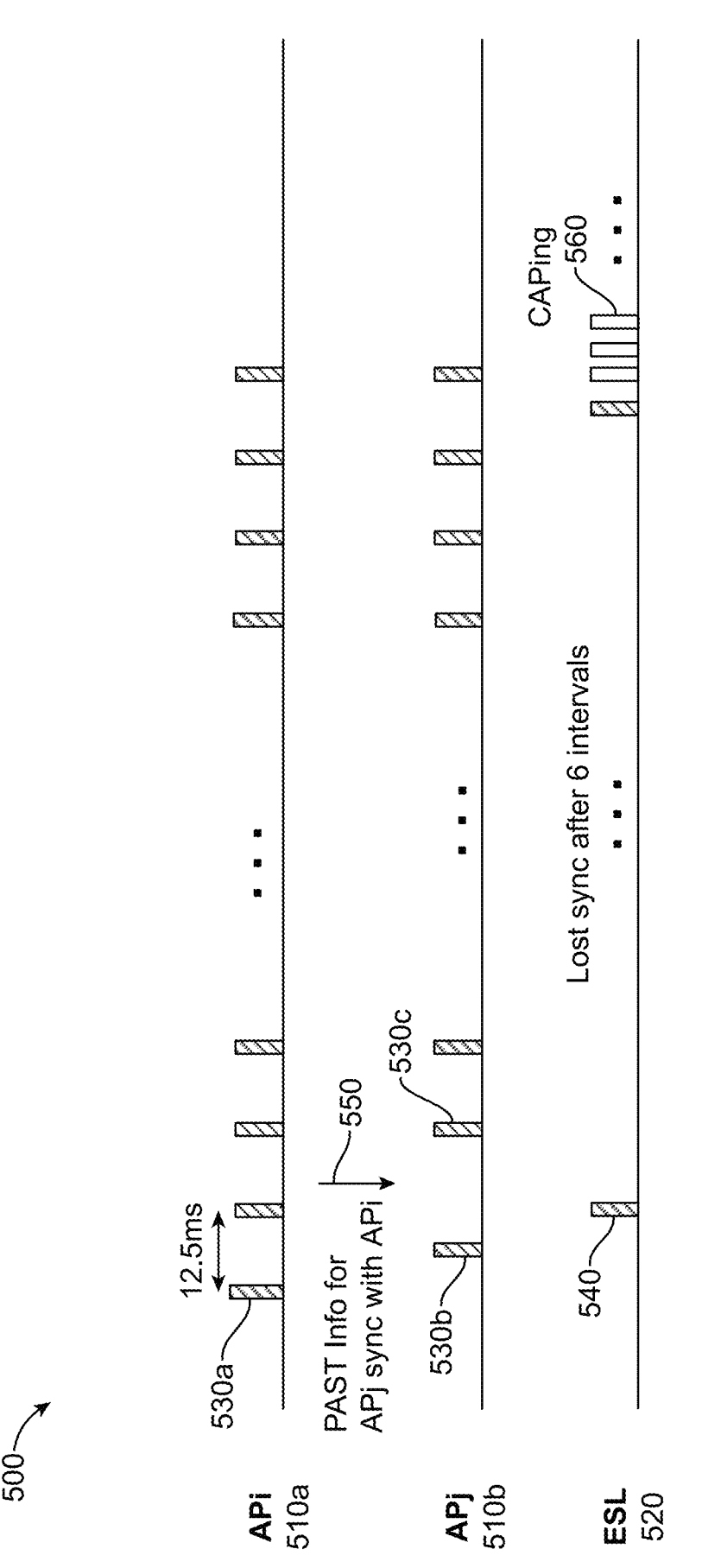
FIG. 5 is a diagram illustrating an example of communication transmissions for updating a clock for an access point, where an ESL associated with the access point loses synchronization, in accordance with some aspects of the present disclosure.

FIG. 5 shows an example of an access point (e.g., APj 510b) updating its clock and, as a result, causing its associated ESL (e.g., ESL 520) to lose synchronization. In particular, FIG. 5 is a diagram illustrating an example of communication transmissions 500 for updating a clock for an access point (e.g., a network device, such as APj 510b), where an ESL (e.g., a wireless communication device, such as ESL 520) associated with the access point (e.g., APj 510b) loses synchronization. In FIG. 5, access point APi 510a (e.g., a network device), access point APj 510b (e.g., a network device), and ESL 520 (e.g., a wireless communication device) are shown. Access point APi 510a may be included within a set of access points that are all synchronized with each other (e.g., by using the method described in the description of FIG. 4). As such, the PA trains (e.g., PAwR trains) of the access points of the set of access points (e.g., which includes access point APi 510a) are all synchronized with each other. The PA train 530a of access point APi 510a is shown in FIG. 5.

Access point APj 510b, however, is not synchronized with the set of access points (e.g., which includes access point APi 510a). As such, the PA train 530b of access point APj 510b will not be synchronized with the PA trains of the access points of the set of access points (e.g., which includes access point APi 510). As shown in FIG. 5, the start of the PA train 530b of access point 510b is not synchronized with the PA train 530a of access point APi 510a.

In one or more examples, the access point APj 510b may desire or may be directed (e.g., commanded by a management entity, such as management entity 130 of FIG. 1) to join (e.g., be synchronized with) the set of access points. During operation for the synchronization, the access point APj 510b may join (e.g., be synchronized with) the set of access points by scanning for (e.g., to receive) a synchronization message 550 (e.g., AP_SYNC) transmitted by one of the access points (e.g., access point APi 510a) within the set of access points. FIG. 5 shows access point APi 510a transmitting a synchronization message 550, and access point APj 510b receiving the synchronization message 550. The synchronization message can contain synchronization information, which may at least include PAST information, that access point APj 510b can use to synchronize itself (e.g., its clock) with access point APi 510a. In some cases, there can be two different ways to obtain the synchronization information, which are connectionless (e.g., to use the synchronization information carried inside an ADV_EXT_IND PDU) and over connection (e.g., to use PAST information from LL_PERIODIC_SYNC_IND or LL PERIODIC_SYNC_WR_IND (PAWR) PDU).

After access point APj 510b has received the synchronization message 550, the access point APj 510b can use the synchronization information within the synchronization message 550 to synchronize itself (e.g., its PA train) with access point APi 510a. As shown in FIG. 5, the continuing PA train 530c of access point APj 510b has been synchronized with the PA train 530a of access point APi 510a.

The ESL 520, which is associated with access point APj 510b, has not been notified of the synchronization update (e.g., clock update) for access point APj 510b. As such, the ESL 520 will simply continue to awaken to scan 540 for (e.g., to receive) messages (e.g., PAs) according to its current schedule. After a number of intervals have passed (e.g., six ESL scanning intervals) in time without the ESL 520 receiving any messages, the ESL 520 will have lost synchronization and will need to be re-onboarded (e.g. resynchronized). For the re-onboarding (e.g., resynchronization) of the ESL 520, the ESL 520 can begin to transmit connectable advertisement packets (CAPs) 560. The re-onboarding procedure (e.g., which involves the ESL 520 needing to transmit CAPs 560 and scanning for responses to the CAPs) has the disadvantage of requiring the consumption valuable resources, such as communication resources (e.g., frequency bandwidth) and computing resources (e.g., processor resources, memory resources, and/or battery resources) utilized for generating and transmitting the CAPs and for scanning for (e.g., receiving) and processing of responses to the CAPs.

Figure 6:
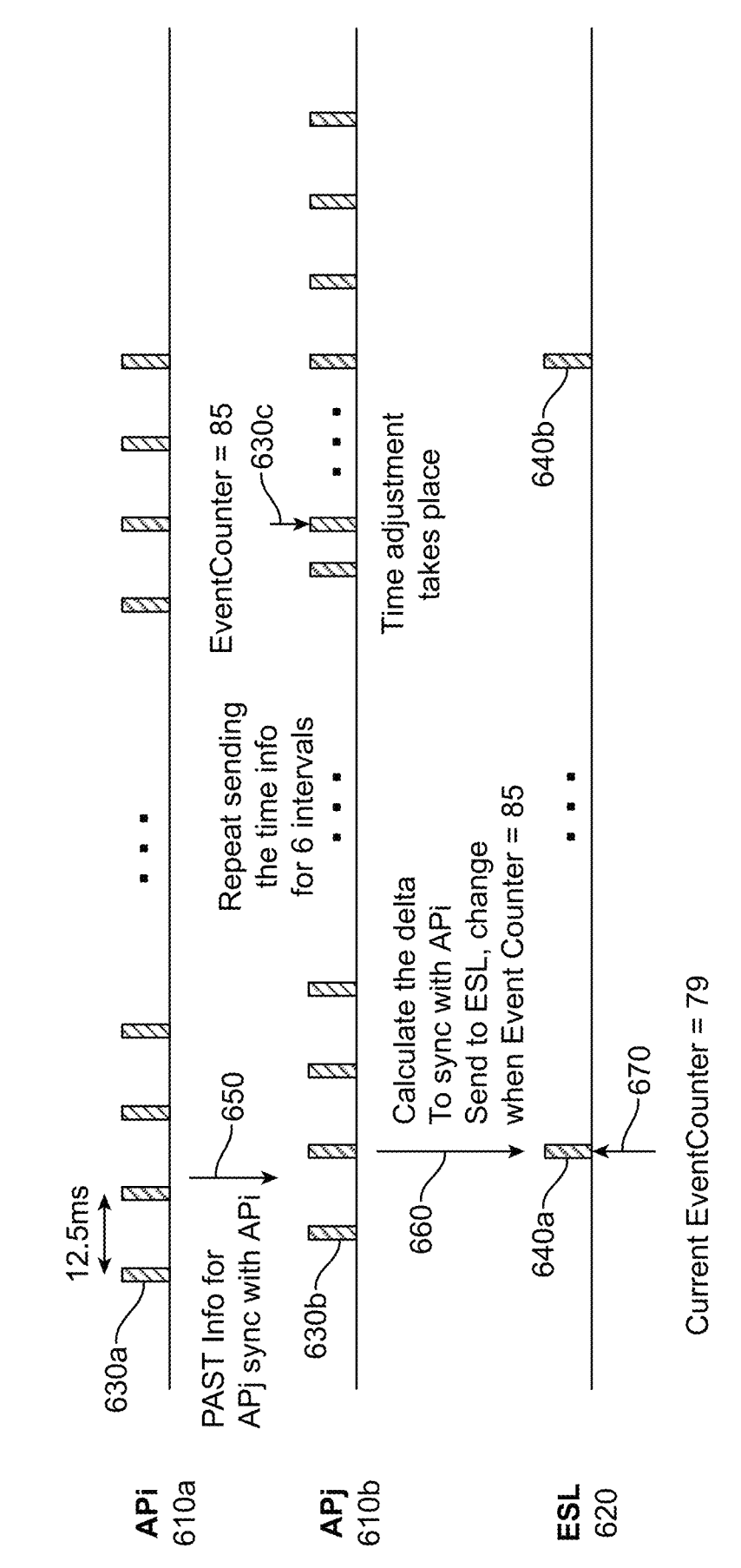
FIG. 6 is a diagram illustrating an example of communication transmissions for updating a clock for an access point, where an ESL associated with the access point maintains synchronization, in accordance with some aspects of the present disclosure.

As previously mentioned, the systems and techniques provide a solution to update clocks (e.g., timing of PAwR trains) of access points as well as ESLs within an ESL system, such that the ESLs do not lose synchronization during the clock update. FIG. 6 shows an example of an access point (e.g., APj 610b) updating its clock and providing the updated clock information to its associated ESL (e.g., ESL 620) such that the ESL can maintain synchronization. In particular, FIG. 6 is a diagram illustrating an example of communication transmissions 600 for updating a clock for an access point (e.g., a network device, such as APj 610b), where an ESL (e.g., a wireless communication device, such as ESL 620) associated with the access point (e.g., APj 610b) maintains synchronization. In FIG. 6, access point APi 610a (e.g., a network device), access point APj 610b (e.g., a network device), and ESL 620 (e.g., a wireless communication device) are shown. In other examples, more access points and/or more ESLs, than as shown in FIG. 6, may be employed. Access point APi 610a may be included within a set of access points that are synchronized with each other (e.g., by using the method described in the description of FIG. 4). The PA trains (e.g., PAwR trains) of the access points of the set of access points (e.g., which includes access point APi 610a) are synchronized with each other. In FIG. 6, the PA train 630a of access point APi 610a is shown.

Access point APj 610b is not synchronized with the set of access points (e.g., which includes access point APi 610a). The PA train 630b of access point APj 610b will not be synchronized with the PA trains of the access points of the set of access points (e.g., which includes access point APi 610). As such, the start of the PA train 630b of access point 610b is shown to not be synchronized with the PA train 630a of access point APi 610a.

The access point APj 610b may desire or may be directed (e.g., commanded by a management entity, such as management entity 130 of FIG. 1) to join (e.g., be synchronized with) the set of access points, which can include access point APi 610a. During operation for the synchronization, the access point APj 610b may join (e.g., be synchronized with) the set of access points by scanning for (e.g., to receive) a synchronization message 650 (e.g., AP_SYNC) transmitted by one of the access points (e.g., access point APi 610a) within the set of access points. FIG. 6 shows access point APi 610a transmitting a synchronization message 650. FIG. 6 also shows access point APj 610b receiving the synchronization message 650 from access point APi 610a. The synchronization message may contain synchronization information (e.g., which may at least include PAST information) that access point APj 610b may use to synchronize itself (e.g., its clock, such as for its PA timing) with access point APi 610a (e.g., as well as with the set of access points).

After access point APj 610b has received the synchronization message 650 from access point APi 610a, access point APj 610b can gather clock information from the synchronization message 650. The clock information may include, but is not limited to, a delta offset (e.g., a time shift) between the PA train 630a of access point APi 610a and the PA train 630b of access point APj 610b. In one or more examples, the access point APj 610b can obtain the delta offset by calculating the delta time by using the PAST information from the synchronization message 650.

After access point APj 610b has gathered the clock information, access point APj 610b can record (e.g., store in memory, such as memory 215 of FIG. 2) the clock information. Access point APj 610b can send (e.g., transmit) a clock update command 660 (e.g., which may be a vendor specific command) to all of its onboarded ESLs, which can include ESL 620. In one or more examples, the access point APj 610b can repeatedly send (e.g., transmit) the clock update command 660 for a number of (e.g., six) intervals (e.g., PA intervals) over time. Access point APj 610b will not update its clock immediately according to the PAST information contained within the synchronization message 650. But, rather, the application of the new clock schedule can be triggered based on a specific instant specified within the clock update command 660.

In one or more examples, the clock update command 660 may include clock update information, which may include, but is not limited to, the delta offset (e.g., the time shift between PA trains): offset units for the delta offset: an instant for an event counter (e.g., EventCounter), such as Event-Counter is equal to eighty-five (85), for when the delta offset should be applied to the PA train for synchronization: optionally the PAST information: optionally a new access point address (e.g., a New Access Address) for access point APj 610b; and optionally the hopping frequency sequence for access point APj 610b.

FIG. 7 shows a table 700 containing example clock update information that may be included within the clock update command 660. In FIG. 7, the table 700 is shown to include three columns, which can include a size column 710, a field column 720, and a description column 730. The field column 720 of the table 700 contains different types of clock update information (e.g., delta offset, offset units, and instant) that may be included within the clock update command 660. The size column 710 of the table 700 indicates the size (e.g., two octets, 1 bit, and 2 octets) for each of the different types of clock update information in the field column 720 of the table 700. The description column 730 of the table 700 contains a brief description describing details of the different types of clock update information in the field column 720 of the table 700.

Referring back to FIG. 6, after access point APj 610b has sent (e.g., transmitted) the clock update command 660 to all of its onboarded ESLs (e.g., which can include ESL 620), ESL 620 can receive the clock update command 660 when it scans 640a for (e.g., to receive) messages (e.g., PAs) according to its current schedule. As shown in FIG. 6, the ESL 620 has received the clock update command 660 from access point APj 610b when its current event counter (e.g., EventCounter) is equal to seventy-nine (79). After ESL 620 has received the clock update command 660 from access point APj 610b, ESL 620 can record (e.g., store in memory, such as memory 215 of FIG. 2) the clock update information from the clock update command 660.

Then, the access point APj 610b and the ESL 620 can both apply the delta offset (e.g., timing shift) to their scheduling (e.g., PA trains) when their respective event counters, which are synchronized with each other, reach the instant (e.g., 85), as is indicated within the clock update information of the clock update command 660. As shown in FIG. 6, when the event counter for access point APj 610b is equal to 85, access point APj 610b has applied the delta offset and, as such, the PA train 630c of access point APj 610b is now synchronized with the PA train 630a of access point APi 610a. Also shown in FIG. 6, for the interval (e.g., ESL scanning interval) subsequent the event counter for ESL 620 reaching 85, the ESL 620 has applied the delta offset to its scheduling such that its scheduling (e.g., for the ESL 620 to scan 640b for messages) is synchronized with the PA train 630c of access point APj 610b. The PA train 630c of access point APj 610b is synchronized with the PA train 630a of APi 610a.

Figure 8:
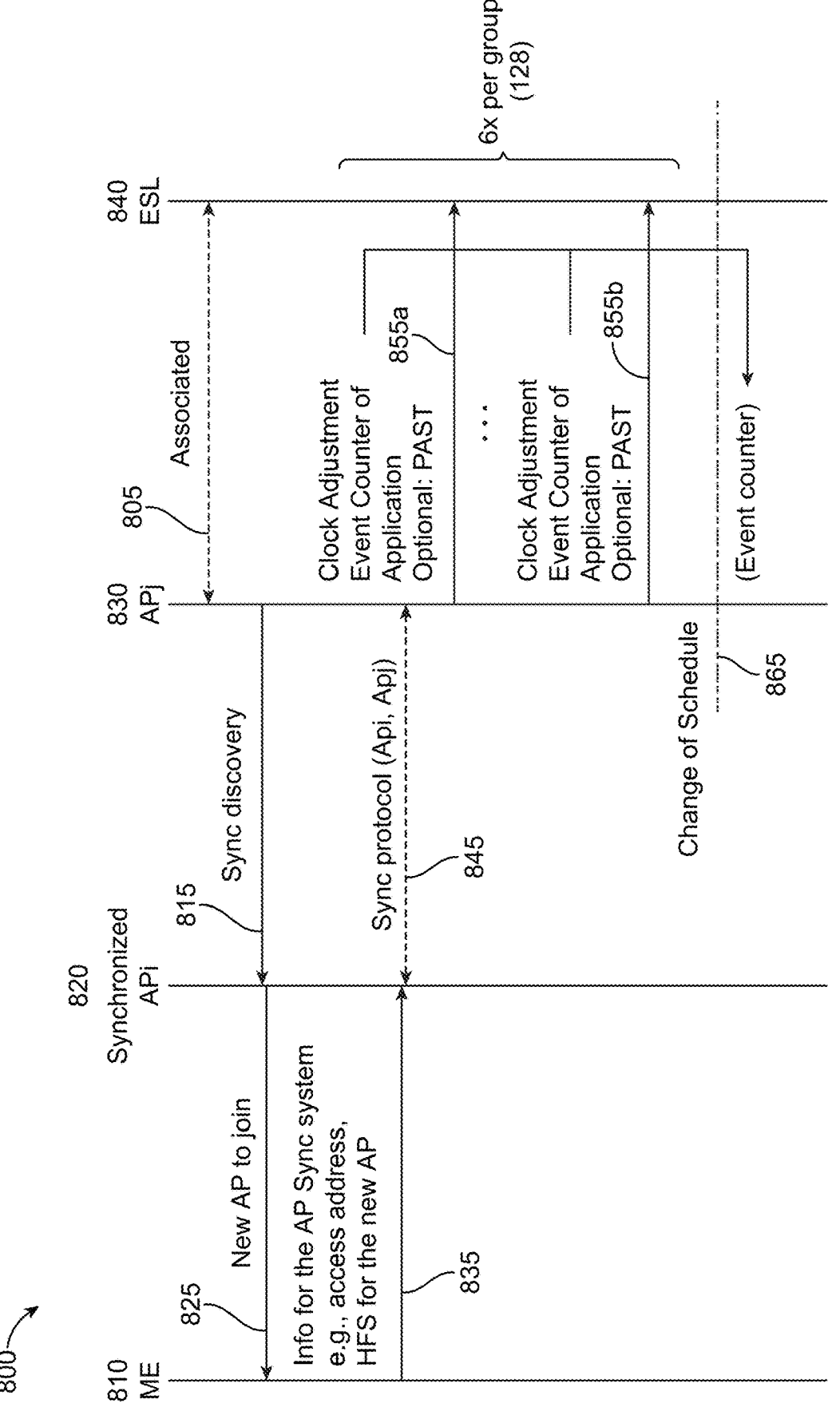
FIG. 8 is a signaling diagram illustrating an example of signaling for updating a clock for an access point, where an ESL associated with the access point maintains synchronization, in accordance with some aspects of the present disclosure.

FIG. 8 is a signaling diagram 800 illustrating an example of signaling for updating a clock for an access point (e.g., a network device, such as APj 830), where an ESL (e.g., a wireless communication device, such as ESL 840) associated with the access point (e.g., APj 830) maintains synchronization. In FIG. 8, a management entity 810 (e.g., a network entity), an access point APi 820 (e.g., a network device), an access point APj 830 (e.g., a network device), and an ESL 840 (e.g., a wireless communication device) are shown. In one or more examples, access point APi 820 may be synchronized with a set (e.g., a group) of access points. ESL 840 is associated 805 with and synchronized with access point APj 830. In other examples, more access points and/or more ESLs, than as shown in FIG. 8, may be employed.

During operation for updating a clock (e.g., synchronizing PA trains) for access point APj 830 and ESL 840, access point APj 830 may transmit a synchronization (Sync) discovery message 815 to access point APi 820 to indicate that access point APj 830 wants to join (e.g., synchronize with) access point APi 820, which is synchronized with a set of access points. After access point APi 820 receives the synchronization (Sync) discovery message 815 from access point APj 830, access point APi 820 can transmit an access point joining message 825 to the management entity 810 to indicate that access point APj 830 wants to join (e.g., to be synchronized with) the set of access points, which includes access point APi 820.

After the management entity 810 receives the access point joining message 825 from access point APi 820, the management entity 810 can transmit an access point system synchronization message 835 to access point APi 820. The access point system synchronization message 835 may include access point system synchronization information, which may include, but is not limited to, a new access point address for access point APj 830, and optionally a hopping frequency sequence for access point APj 830.

In some examples, after the management entity 810 receives the access point joining message 825 from access point APi 820, the management entity 810 can transmit an access point system synchronization message 835 to access point APi 820. The access point system synchronization message 835 may include access point system synchronization information, which may include, but is not limited to, a time schedule (e.g., for transmitting a PA train). The management entity 810 can also transmit a secondary access point system synchronization message (not shown) directly to access point APj 830. The secondary access point system synchronization message may include secondary access point system synchronization information, which may include, but is not limited to, the new access point address for access point APj 830, and optionally a hopping frequency sequence for access point APj 830. After access point APi 820 receives the access point system synchronization message 835 from the management entity 810, access point APi 820 can transmit and receive synchronization messages (e.g., using a synchronization protocol 845) to and from access point APj 830. At least one of the synchronization messages (e.g., AP_SYNC) transmitted to access point APj 830 may contain synchronization information. The synchronization information may include, but is not limited to, PAST information, the new access point address for access point APj 830, and optionally the hopping frequency sequence for access point APj 830.

After access point APj 830 receives the synchronization message (e.g., AP_SYNC), which includes the synchronization information, access point APj 830 can gather clock information from the synchronization message. The clock information can include, but is not limited to, a delta offset (e.g., a time shift) between a PA train of access point APi 820 and a PA train of access point APj 830, the new access point address for access point APj 830, and optionally the hopping frequency sequence for access point APj 830.

After access point APj 830 has gathered the clock information, access point APj 830 may record (e.g., store in memory, such as memory 215 of FIG. 2) the clock information. Access point APj 830 may send (e.g., transmit) a clock update command 855a (e.g., which may be a vendor specific command) to all of its onboarded ESLs, which can include ESL 840. The access point APj 830 can repeatedly send (e.g., transmit) the clock update command 855a, 855b for N number (e.g., six) of intervals (e.g., PA intervals) over time. The clock update command 855a, 855b may include clock update information, which can include, but is not limited to, the delta offset (e.g., the time shift between PA trains), offset units for the delta offset, an instant for an event counter (e.g., EventCounter) for when the delta offset should be applied to the PA train for synchronization, optionally the PAST information, optionally the new access point address for access point APj 830, and optionally the hopping frequency sequence for access point APj 830.

After access point APj 830 has sent (e.g., transmitted) the clock update command 855a, 855b to all of its onboarded ESLs, which can include ESL 840, ESL 840 can receive the clock update command 855a, 855b when it scans for (e.g., to receive) messages (e.g., PAs) according to its current schedule. After ESL 840 has received the clock update command 855a, 855b from access point APj 830, ESL 840 may record (e.g., store in memory, such as memory 215 of FIG. 2) the clock update information from the clock update command 855a. 855b.

When the event counters (e.g., which are synchronized) of both access point APj 830 and the ESL 840 have reached the instant (e.g., 85) specified within the clock update information of the clock update command 855a, 855b, access point APj 830 and the ESL 840 can both apply the delta offset (e.g., timing shift) to their scheduling (e.g., PA trains) (e.g., change their scheduling 865). Once access point APj 830 and the ESL 840 have applied the delta offset to their scheduling, access point APj 830 will be synchronized with the set of access points (e.g., which includes access point APi 820), and the ESL 840 will be synchronized with access point APj 830.

FIG. 9 is a flow chart illustrating an example of a process 900 for wireless communications utilizing methods for a clock update in a wireless communication device (e.g., ESL) system. The process 900 can be performed by a first network device (e.g., an AP, such as the AP_j 610b of FIG. 6) or by a component or system (e.g., a chipset) of the first network device. The operations of the process 900 may be implemented as software components that are executed and run on one or more processors (e.g., processor 1110 of FIG. 11 or other processor(s)). Further, the transmission and reception of signals by the wireless communications device in the process 900 may be enabled, for example, by one or more antennas and/or one or more transceivers such as one or more wireless transceivers (e.g., the communication interface 1140 of FIG. 11).

At block 910, the first network device (or component thereof) can receive (e.g., via the communication interface 1140 of FIG. 11), from a second network device (e.g., a second AP), a synchronization message comprising synchronization information. In some cases, the synchronization information includes periodic advertisement synchronization transfer (PAST) information. In some examples, the synchronization information further includes an address for the first network device and/or a hopping frequency sequence for the first network device.

At block 920, the first network device (or component thereof) can determine (e.g., via the processor 1110 of FIG. 11) clock information based on the synchronization information. In some aspects, to determine the clock information, the first network device (or component thereof) can calculate a delta offset (e.g., based on the PAST information included in the synchronization information). In such aspects, the clock information can include the delta offset. In some cases, the first network device (or component thereof) can record the clock information (e.g., the delta offset) in memory.

At block 930, the first network device (or component thereof) can generate (e.g., via the processor 1110 of FIG. 11) a clock update command based on the clock information. As described previously, the clock update command can correspond to changing a time schedule at which periodic transmissions (e.g., periodic advertisement transmissions, such as PAwR transmissions) are expected by one or more wireless communication devices. For instance, in some aspects, the clock update command includes clock update information, such as the delta offset, offset units for the delta offset, an instant for when the delta offset is applied, any combination thereof, and/or other clock update information. In some cases, the clock update information further includes periodic advertisement synchronization transfer (PAST) information, an address for the first network device, a hopping frequency sequence for the first network device, any combination thereof, and/or other information. In some examples, the clock update command is a vendor specific command.

At block 940, the first network device (or component thereof) can transmit (e.g., via the communication interface 1140 of FIG. 11) the clock update command to one or more wireless communication devices associated with the first network device (e.g., one or more electronic shelf labels (ESLs) associated with a first AP). In some aspects, to transmit the clock update command, the first network device (or component thereof) can repeatedly transmit N number of intervals over time the clock update command. In some cases, the intervals are periodic advertisement (PA) intervals.

At block 950, the first network device (or component thereof) can apply (e.g., via the processor 1110 of FIG. 11) the clock information to a clock of the first network device such that the first network device is synchronized with the second network device. For example, applying the clock information to the clock of the first network device can shift in time a periodic advertisement (PA) train (e.g., a PAwR train) of the first network device.

Figure 10:
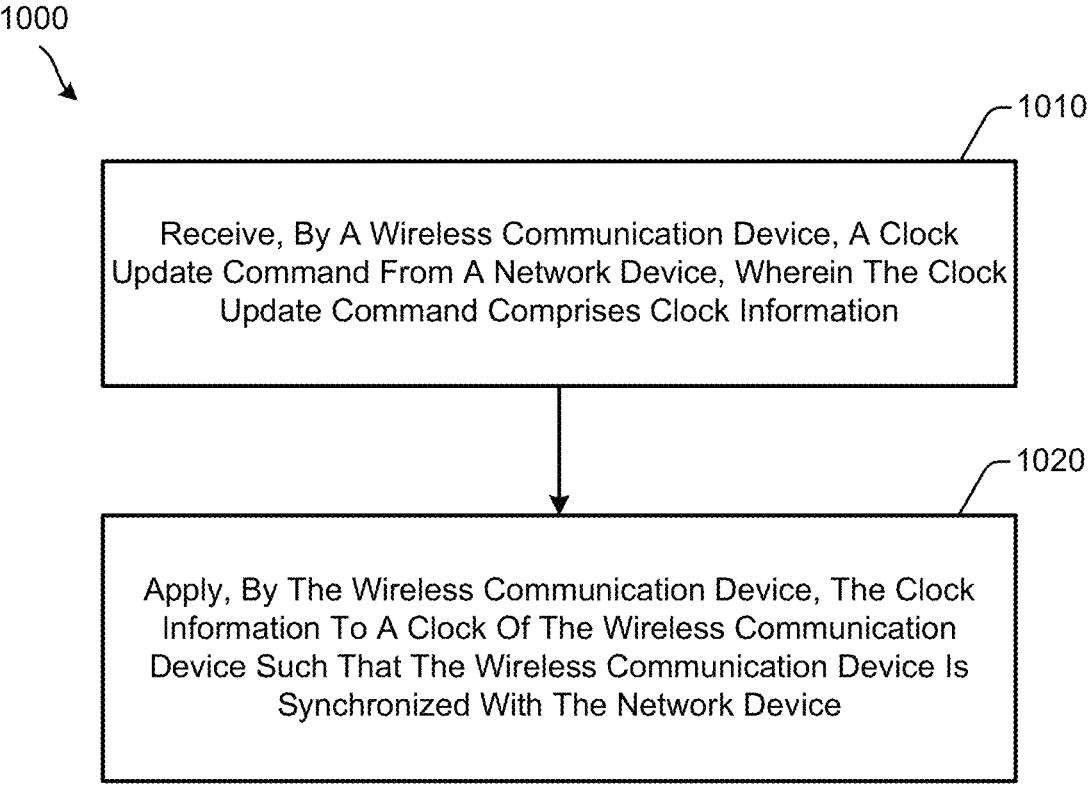
FIG. 10 is a flow chart illustrating an example of a process for wireless communications at a wireless communication device, in accordance with some aspects of the present disclosure.

FIG. 10 is a flow chart illustrating an example of a process 1000 for wireless communications utilizing methods for a clock update in a wireless communication device (e.g., ESL). The process 1000 can be performed by a wireless communication device (e.g., an ESL, such as ESL 620 of FIG. 6) or by a component or system (e.g., a chipset) of the wireless communication device. The operations of the process 1000 may be implemented as software components that are executed and run on one or more processors (e.g., processor 1110 of FIG. 11 or other processor(s)). Further, the transmission and reception of signals by the wireless communications device in the process 1000 may be enabled, for example, by one or more antennas and/or one or more transceivers such as one or more wireless transceivers (e.g., the communication interface 1140 of FIG. 11).

At block 1010, the wireless communication device (or component thereof) can receive (e.g., via the communication interface 1140 of FIG. 11) a clock update command from a network device (e.g., an AP). The clock update command includes clock information. In some cases, the clock information can include a delta offset. For example, as described above, the delta offset can be determined by the network device based on the PAST information included in synchronization information received by the network device. As previously described, the clock update command can correspond to changing a time schedule at which periodic transmissions (e.g., periodic advertisement transmissions, such as PAwR transmissions) are expected by the wireless communication device. For instance, in some aspects, the clock update command includes clock update information, such as the delta offset (e.g., determined by the network device), offset units for the delta offset, an instant for when the delta offset is applied, any combination thereof, and/or other clock update information. In some cases, the clock update information further includes periodic advertisement synchronization transfer (PAST) information, an address for the first network device, a hopping frequency sequence for the first network device, any combination thereof, and/or other information. In some examples, the clock update command is a vendor specific command. In some aspects, the clock update command is repeatedly transmitted N number of intervals (e.g., PA intervals, such as PAwR intervals) over time.

At block 1020, the wireless communication device (or component thereof) can apply (e.g., via the processor 1110 of FIG. 11) the clock information to a clock of the wireless communication device such that the wireless communication device is synchronized with the network device. For example, application of the clock information to a clock of the wireless communication device can shift in time a scanning interval (or timing schedule) of the wireless communication device.

The network device and the wireless communication device may each include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the network device configured to perform the process 900 of FIG. 9 and/or the wireless communication device configured to perform the process 1000 of FIG. 10 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 and the process 1000 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900, process 1000, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
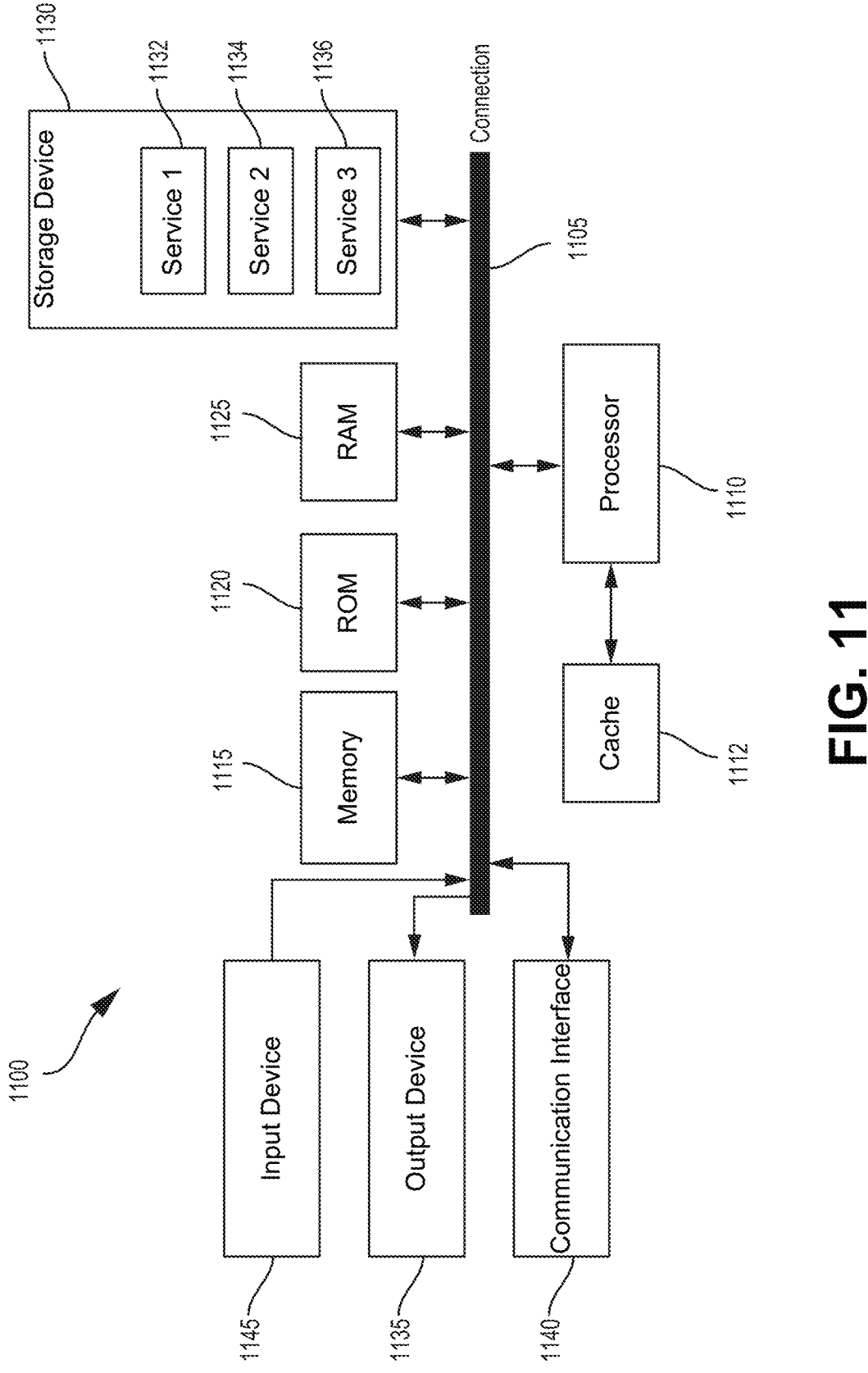
FIG. 11 is a block diagram illustrating an example of a computing system, which may be employed by the disclosed systems and techniques for a clock update in a wireless communication device (e.g., ESL) system, in accordance with some aspects of the present disclosure.

FIG. 11 is a block diagram illustrating an example of a computing system 1100, which may be employed by the disclosed systems and techniques for a clock update in a wireless communication device (e.g., ESL). In particular, FIG. 11 illustrates an example of computing system 1100, which can be, for example, any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., LIDAR sensors, laser range finders, RF radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), pro-grammable read-only memory (PROM), erasable program-mable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combi-nation thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environ-ments and applications beyond those described herein with-out departing from the broader scope of the specification. The specification and drawings are, accordingly, to be regarded as illustrative rather than restrictive. For the pur-poses of illustration, methods were described in a particular order. It should be appreciated that in alternate aspects, the methods may be performed in a different order than that described.

For clarity of explanation, in some instances the present technology may be presented as including individual func-tional blocks comprising devices, device components, steps or routines in a method embodied in software, or combina-tions of hardware and software. Additional components may be used other than those shown in the figures and/or described herein. For example, circuits, systems, networks, processes, and other components may be shown as compo-nents in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hard-ware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termina-tion can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method of wireless communication performed at a first network device, the method comprising: receiving, by the first network device from a second network device, a synchronization message comprising synchronization information: determining, by the first network device, clock information based on the synchronization information: generating, by the first network device, a clock update command based on the clock information: transmitting, by the first network device, the clock update command to one or more wireless communication devices associated with the first network device; and applying, by the first network device, the clock information to a clock of the first network device such that the first network device is synchronized with the second network device.

Aspect 2. The method of Aspect 1, wherein the synchronization information comprises periodic advertisement synchronization transfer (PAST) information.

Aspect 3. The method of Aspect 2, wherein determining, by the first network device, the clock information comprises calculating, by the first network device, a delta offset based on the PAST information.

Aspect 4. The method of Aspect 3, wherein the clock information comprises the delta offset.

Aspect 5. The method of any one of Aspects 2 to 4, wherein the synchronization information further comprises at least one of an address for the first network device or a hopping frequency sequence for the first network device.

Aspect 6. The method of any one of Aspects 1 to 5, further comprising recording, by the first network device, the clock information in memory.

Aspect 7. The method of any one of Aspects 1 to 6, wherein the clock update command is a vendor specific command.

Aspect 8. The method of any one of Aspects 1 to 7, wherein the clock update command comprises clock update information, and wherein the clock update information comprises at least one of a delta offset, offset units for the delta offset, an instant for when the delta offset is applied.

Aspect 9. The method of Aspect 8, wherein the clock update information further comprises at least one of periodic advertisement synchronization transfer (PAST) information, an address for the first network device, or a hopping frequency sequence for the first network device.

Aspect 10. The method of any one of Aspects 1 to 9, wherein transmitting, by the first network device, the clock update command comprises repeatedly transmitting N number of intervals over time, by the first network device, the clock update command.

Aspect 11. The method of Aspect 10, wherein the intervals are periodic advertisement (PA) intervals.

Aspect 12. The method of any one of Aspects 1 to 11, wherein applying, by the first network device, the clock information to the clock of the first network device shifts in time a periodic advertisement (PA) train of the first network device.

Aspect 13. The method of any one of Aspects 1 to 12, wherein the first network device is a first access point (AP) and the second network device is a second AP.

Aspect 14. The method of any one of Aspects 1 to 13, wherein a wireless communication device of the one or more wireless communication devices is an electronic shelf label (ESL).

Aspect 15. A first network device for wireless communication, the first network device comprising: at least one memory; and at least one processor coupled to the at least one memory and configured to: receive, from a second network device, a synchronization message comprising synchronization information; determine clock information based on the synchronization information: generate a clock update command based on the clock information: transmit the clock update command to one or more wireless communication devices associated with the first network device; and apply the clock information to a clock of the first network device such that the first network device is synchronized with the second network device.

Aspect 16. The first network device of Aspect 15, wherein the synchronization information comprises periodic advertisement synchronization transfer (PAST) information.

Aspect 17. The first network device of Aspect 16, wherein, to determine the clock information, the at least one processor is configured to calculate a delta offset based on the PAST information.

Aspect 18. The first network device of Aspect 17, wherein the clock information comprises the delta offset.

Aspect 19. The first network device of any one of Aspects 16 to 18, wherein the synchronization information further comprises at least one of an address for the first network device or a hopping frequency sequence for the first network device.

Aspect 20. The first network device of any one of Aspects 15 to 19, wherein the at least one processor is configured to record the clock information in memory.

Aspect 21. The first network device of any one of Aspects 15 to 20, wherein the clock update command is a vendor specific command.

Aspect 22. The first network device of any one of Aspects 15 to 21, wherein the clock update command comprises clock update information, and wherein the clock update information comprises at least one of a delta offset, offset units for the delta offset, an instant for when the delta offset is applied.

Aspect 23. The first network device of Aspect 22, wherein the clock update information further comprises at least one of periodic advertisement synchronization transfer (PAST) information, an address for the first network device, or a hopping frequency sequence for the first network device.

Aspect 24. The first network device of any one of Aspects 15 to 23, wherein, to transmit the clock update command, the at least one processor is configured to repeatedly transmit N number of intervals over time the clock update command.

Aspect 25. The first network device of Aspect 24, wherein the intervals are periodic advertisement (PA) intervals.

Aspect 26. The first network device of any one of Aspects 15 to 25, wherein application of the clock information to the clock of the first network device shifts in time a periodic advertisement (PA) train of the first network device.

Aspect 27. The first network device of any one of Aspects 15 to 26, wherein the first network device is a first access point (AP) and the second network device is a second AP.

Aspect 28. The first network device of any one of Aspects 15 to 27, wherein a wireless communication device of the one or more wireless communication devices is an electronic shelf label (ESL).

Aspect 29. A method of wireless communication performed at a wireless communication device, the method comprising: receiving, by the wireless communication device, a clock update command from a network device, wherein the clock update command comprises clock information; and applying, by the wireless communication device, the clock information to a clock of the wireless communication device such that the wireless communication device is synchronized with the network device.

Aspect 30. The method of Aspect 29, wherein applying, by the wireless communication device, the clock information to a clock of the wireless communication device shifts in time a scanning interval of the wireless communication device.

Aspect 31. A wireless communication device for wireless communication, the wireless communication device comprising: at least one memory; and at least one processor coupled to the at least one memory and configured to: receive a clock update command from a network device, wherein the clock update command comprises clock information; and apply the clock information to a clock of the wireless communication device such that the wireless communication device is synchronized with the network device.

Aspect 32. The wireless communication device of Aspect 31, wherein application of the clock information to a clock of the wireless communication device shifts in time a scanning interval of the wireless communication device.

Aspect 33. A non-transitory computer-readable medium having stored thereon instructions that, when executed by at least one processor, cause the at least one processor to perform operation according to any of Aspects 1 to 14.

Aspect 34. An apparatus for wireless communications, comprising one or more means for performing operations according to any of Aspects 1 to 14.

Aspect 35. A non-transitory computer-readable medium having stored thereon instructions that, when executed by at least one processor, cause the at least one processor to perform operation according to any of Aspects 29 or 30.

Aspect 36. An apparatus for wireless communications, comprising one or more means for performing operations according to any of Aspects 29 or 30.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method of wireless communication performed at a first network device, the method comprising:
receiving, by the first network device from a second network device, a synchronization message comprising synchronization information;
determining, by the first network device, clock information based on the synchronization information;
generating, by the first network device, a clock update command based on the clock information;
transmitting, by the first network device, the clock update command to one or more wireless communication devices associated with the first network device; and applying, by first the network device, the clock information to a clock of the first network device such that the first network device is synchronized with the second network device.

2. The method of claim 1, wherein the synchronization information comprises periodic advertisement synchronization transfer (PAST) information.

3. The method of claim 2, wherein determining, by the first network device, the clock information comprises calculating, by the first network device, a delta offset based on the PAST information.

4. The method of claim 3, wherein the clock information comprises the delta offset.

5. The method of claim 2, wherein the synchronization information further comprises at least one of an address for the first network device or a hopping frequency sequence for the first network device.

6. The method of claim 1, further comprising recording, by the first network device, the clock information in memory.

7. The method of claim 1, wherein the clock update command is a vendor specific command.

8. The method of claim 1, wherein the clock update command comprises clock update information, and wherein the clock update information comprises at least one of a delta offset, offset units for the delta offset, an instant for when the delta offset is applied.

9. The method of claim 8, wherein the clock update information further comprises at least one of periodic advertisement synchronization transfer (PAST) information, an address for the first network device, or a hopping frequency sequence for the first network device.

10. The method of claim 1, wherein transmitting, by the first network device, the clock update command comprises repeatedly transmitting N number of intervals over time, by the first network device, the clock update command.

11. The method of claim 10, wherein the intervals are periodic advertisement (PA) intervals.

12. The method of claim 1, wherein applying, by the first network device, the clock information to the clock of the first network device shifts in time a periodic advertisement (PA) train of the first network device.

13. The method of claim 1, wherein the first network device is a first access point (AP) and the second network device is a second AP.

14. The method of claim 1, wherein a wireless communication device of the one or more wireless communication devices is an electronic shelf label (ESL).

15. A first network device for wireless communication, the first network device comprising:
at least one memory; and
at least one processor coupled to the at least one memory and configured to:
receive, from a second network device, a synchronization message comprising synchronization information;
determine clock information based on the synchronization information;
generate a clock update command based on the clock information;
transmit the clock update command to one or more wireless communication devices associated with the first network device; and
apply the clock information to a clock of the first network device such that the first network device is synchronized with the second network device.

16. The first network device of claim 15, wherein the synchronization information comprises periodic advertisement synchronization transfer (PAST) information.

17. The first network device of claim 16, wherein, to determine the clock information, the at least one processor is configured to calculate a delta offset based on the PAST information.

18. The first network device of claim 17, wherein the clock information comprises the delta offset.

19. The first network device of claim 16, wherein the synchronization information further comprises at least one of an address for the first network device or a hopping frequency sequence for the first network device.

20. The first network device of claim 15, wherein the at least one processor is configured to record the clock information in memory.

21. The first network device of claim 15, wherein the clock update command is a vendor specific command.

22. The first network device of claim 15, wherein the clock update command comprises clock update information, and wherein the clock update information comprises at least one of a delta offset, offset units for the delta offset, an instant for when the delta offset is applied.

23. The first network device of claim 22, wherein the clock update information further comprises at least one of periodic advertisement synchronization transfer (PAST) information, an address for the first network device, or a hopping frequency sequence for the first network device.

24. The first network device of claim 15, wherein, to transmit the clock update command, the at least one processor is configured to repeatedly transmit N number of intervals over time the clock update command.

25. The first network device of claim 24, wherein the intervals are periodic advertisement (PA) intervals.

26. The first network device of claim 15, wherein application of the clock information to the clock of the first network device shifts in time a periodic advertisement (PA) train of the first network device.

27. The first network device of claim 15, wherein the first network device is a first access point (AP) and the second network device is a second AP.

28. The first network device of claim 15, wherein a wireless communication device of the one or more wireless communication devices is an electronic shelf label (ESL).

* * * * *